(12) United States Patent
Aoki et al.

(10) Patent No.: US 7,540,066 B2
(45) Date of Patent: Jun. 2, 2009

(54) FASTENER FOR FLOOR MAT

(75) Inventors: Ryou Aoki, Yokohama (JP); Kazunori Kanda, Hiroshima (JP); Kouji Ogata, Hiroshima (JP)

(73) Assignee: Piolax Inc., Yokohama-shi, Kanagawa (JP)

( * ) Notice: Subject to any disclaimer, the term of this patent is extended or adjusted under 35 U.S.C. 154(b) by 534 days.

(21) Appl. No.: 11/483,584

(22) Filed: Jul. 11, 2006

(65) Prior Publication Data

US 2007/0011844 A1    Jan. 18, 2007

(30) Foreign Application Priority Data

Jul. 15, 2005    (JP)    ............................. 2005-206970

(51) Int. Cl.
   *A47G 27/04*    (2006.01)
(52) U.S. Cl. ............................................. 16/4
(58) Field of Classification Search ................ 16/4, 16/8, 6, 17, DIG. 40; 24/24, 297, 16 R, 455, 24/285; 248/74.1, 74.2, 74.3, 62, 68.1, 217.2, 248/499; 411/457–460, 450, 451.3, 451.1, 411/456; 296/184.1
   See application file for complete search history.

(56) References Cited

U.S. PATENT DOCUMENTS

| 3,208,095 | A | * | 9/1965 | Hill | ................................ | 16/16 |
|---|---|---|---|---|---|---|
| 3,423,055 | A | * | 1/1969 | Fisher | ......................... | 248/73 |
| 4,086,679 | A | * | 5/1978 | Butler | .............................. | 16/4 |
| 4,386,752 | A | * | 6/1983 | Pavlak et al. | ................... | 248/73 |
| 4,425,690 | A | * | 1/1984 | Fraser et al. | ................... | 24/351 |
| 5,148,581 | A | * | 9/1992 | Hartmann | ..................... | 24/351 |
| 5,257,768 | A | * | 11/1993 | Juenemann et al. | ......... | 248/604 |
| 5,263,671 | A | * | 11/1993 | Baum | ......................... | 248/68.1 |
| 6,708,933 | B2 | * | 3/2004 | Girodo | ........................ | 248/74.2 |
| 6,754,937 | B1 | * | 6/2004 | Martin | ......................... | 24/351 |

FOREIGN PATENT DOCUMENTS

| BR | 200104660 | A | * | 6/2003 |
|---|---|---|---|---|
| DE | 20016664 | U1 | * | 12/2000 |
| JP | 2004137858 | A | * | 5/2004 |

* cited by examiner

*Primary Examiner*—Chuck Y. Mah
(74) *Attorney, Agent, or Firm*—Westerman, Hattori, Daniels & Adrian, LLP.

(57) ABSTRACT

A fastener for securing an automobile floor mat to a carpet laid on a floor within an automobile includes a lower clamping member, an upper clamping member, a hinge portion connecting the upper clamping member and the lower clamping member in a pivotable manner, a supporting portion forwardly protruded from a tip end portion of the lower clamping member, and a guide protrusion forwardly protruded from a tip end portion of the supporting portion and configured to so as to facilitate an insertion of the supporting portion and the lower clamping member to a backside of the carpet via a slit formed in the carpet. The upper clamping member has an engaging projection formed at an outer surface of a tip end portion thereof and configured to be inserted in an attaching hole formed in the floor mat and a locking portion formed at an inner surface of the tip end portion. The supporting portion has an engaging portion for engaging the engaging portion of the upper clamping member. An upper surface of the guide protrusion is tapered.

19 Claims, 10 Drawing Sheets

FASTENER FOR FLOOR MAT

This application claims priority under 35 U.S.C. §119 to Japanese Patent Application No. 2005-206970 filed on Jul. 15, 2005, the entire disclosure of which is incorporated herein by reference in its entirety.

TECHNICAL FIELD

The present invention relates to a fastener for securing a floor mat to a carpet laid on a surface of a floor, e.g., an automobile floor.

BACKGROUND OF THE INVENTION

The following description sets forth the inventor's knowledge of related art and problems therein and should not be construed as an admission of knowledge in the prior art.

A conventional fastener of this kind is an integrally molded article made of synthetic resin having an upper clamping member and a lower clamping member resiliently connected via a thin hinge portion in a pivotable manner. The lower clamping member is provided with an engaging projection upwardly protruded from the tip end portion thereof, and the upper clamping member is provided with a slit for receiving the engaging projection at the tip end portion thereof. See, Japanese Unexamined Laid-open Patent Publication No. 2000-095010.

In securing a floor mat to a carpet using this fastener, the tip end portion of the lower clamping member is inserted into a T-shaped installation slit formed in the carpet and then the lower clamping member is advanced so as to be located at the backside of the carpet while advancing the engaging projection upwardly protruded from the tip end portion of the lower clamping member along the slip. Upon completion of the insertion, the upper clamping member is pivoted about the thin hinge portion toward the lower clamping member. Thus, the carpet is clamped from its both sides by the upper and lower clamping members with the engaging projection received by the slit. In this state, a floor mat is disposed on the carpet in a state in which the engaging projection upwardly protruded from the lower clamping member is inserted in and engaged with an attaching hole formed in the floor mat. As a result, the floor mat is secured to the carpet without causing displacement of the floor mat.

In the aforementioned fastener, there is an advantage that a floor mat can be assuredly secured to a carpet so as not to be displaced on the carpet. However, inserting the tip end portion of the lower clamping member into the slit of the carpet is troublesome, since it is required to be forcibly inserted into the slit so as to be located at the backside of the carpet.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention significantly improve upon existing methods and/or apparatuses.

Among other potential advantages, some embodiments provide a fastener for securing a floor mat laid on a surface of a floor in a displacement prevented manner.

Among other potential advantages, some embodiments provide a fastener that is less troublesome to install.

Among potential advantages, some embodiments provide a securing structure for securing an automobile floor mat to a carpet laid on a floor of an automobile, According to a first aspect of a preferred embodiment of the present invention, a fastener for securing a floor mat to a carpet laid on a floor is provided. The fastener comprises a lower clamping member, an upper clamping member, a hinge portion that connects the upper lower clamping members in a pivotable manner, a supporting portion forwardly protruded from a tip end portion of the lower clamping member and a guide protrusion forwardly protruding from a tip end portion of the supporting portion and configured to be inserted in a slit formed in the carpet.

The upper clamping member has an engaging projection and a locking portion. The engaging projection is formed at an outer surface of a tip end portion thereof and is configured to be inserted in an attaching space (hole) formed in the floor mat. The locking portion is formed at an inner surface of the tip end portion.

The supporting portion has an engaging portion for engaging the engaging portion of the upper clamping member.

With this embodiment, at the time of inserting the tip end portion side of the lower clamping member into the slit formed in the carpet, the tip end portion side of the lower clamping member can be inserted smoothly, for example, by being guided by the guide protrusion, resulting in an easy insertion operation of the lower clamping member. After the insertion of the lower clamping member, by downwardly pressing the upper clamping member toward the lower clamping member to engage the engaging portion of the upper clamping member with the engaging portion of the lower clamping member side, the carpet can be clamped by the upper and lower clamping members from its both sides. Then, the floor mat can be assuredly secured to the carpet by disposing the floor mat on the carpet with the engaging projection inserted in and engaged with the engaging hole of the floor mat, resulting in no displacement of the floor mat on the carpet.

An upper surface of the guide protrusion, for example, can also be formed into a tapered shape. In this case, for example, at the time of inserting the guide protrusion into the slit of the carpet, the guide protrusion lifts the edge portion of the slit of the carpet to prevent the interfering of the engaging portion of the lower clamping member side with the slit, resulting in an easy insertion operation.

A lower surface of the guide protrusion, for example, may also be inclined upward as it advances toward its tip end. In this case, at the time of inserting the guide protrusion into the slit of the carpet, the insertion operation can be performed easily.

An upper surface of the guide protrusion and an external surface of the engaging portion of the lower clamping member may also be separated by a cutout portion. In this case, since the external surface of the engaging portion can be bent easily, the engaging portions can be assuredly engaged with each other.

A height of the upper surface of the guide protrusion, may also be lower than a height of the receiving portion. In this state, since the upper surface of the guide protrusion is lower than the receiving wall 10 in height, the peripheral portion of the installation hole is disposed on the upper surface of the guide protrusion, thereby preventing the peripheral portion of the installation hole from being disposed on the engaging portion. This results in an easy insertion operation.

The fastener may also comprise a shoulder wall formed on an inner surface of the upper clamping member, a first stopper wall formed between a tip end portion of the lower clamping member and the receiving portion, the first stopper wall coming into contact with the shoulder wall to thereby prevent displacement of the upper clamping member in one direction, and a second stopper wall formed at the receiving portion, the second stopper wall coming into contact with the locking portion to thereby prevent displacement of the upper clamping member in another direction. In this case, for example, the horizontal displacements of the upper clamping member with respect to the lower clamping member can be prevented.

The lower clamping member may also include rows of engaging teeth formed on an upper surface thereof.

The engaging protrusion may also include a head portion formed at an upper end thereof.

The head portion may also be formed into a generally triangular shape as seen from its top.

The faster may also be an integrally formed article made of synthetic resin.

The hinge portion may also be a thin walled portion.

The guide protrusion may also be formed into a generally triangular shape as seen from its side.

A width of the guide protrusion may also be narrowed toward a tip end thereof.

The supporting portion may also extend from the tip end portion of the lower clamping, member in a downwardly stepped manner.

The floor mat is, for example, an automobile floor mat.

According to a another aspect of the present invention, a fastener for securing an automobile floor mat to a carpet laid on a floor within an automobile, includes a lower clamping member an upper clamping member a hinge portion connecting the upper clamping member and the lower clamping member in a pivotable manner a supporting portion forwardly protruded from a tip end portion of the lower clamping member and a guide protrusion forwardly protruded from a tip end portion of the supporting portion and configured to so as to facilitate an insertion of the supporting portion and the lower clamping member to a backside of the carpet via a slit formed in the carpet.

The upper clamping member has an engaging projection formed at an outer surface of a tip end portion thereof and configured to be inserted in an attaching hole formed in the floor mat and a locking portion formed at an inner surface of the tip end portion.

The supporting portion has an engaging portion for engaging the engaging portion of the upper clamping member and an upper surface of the guide protrusion is formed into a tapered shape.

According to another aspect of the present invention, a securing structure for securing an automobile floor mat to a carpet laid on a floor of an automobile, includes a fastener. The carpet has a slit and an installation hole formed apart from the slit at a certain distance and the floor mat has an engaging hole. The lower clamping member of the fastener is disposed at a backside of the carpet with the hinge portion disposed in the slit and the engaging portion inserted in the installation hole. The engaging portion of the upper clamping member is engaged with the engaging portion of the supporting portion. The floor mat is disposed on the carpet with the engaging projection of the fastener inserted in and engaged with the engaging hole of the floor mat.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE INVENTION

In the following paragraphs, some preferred embodiments of the present invention will be described by way of example and not limitation. It should be understood based on this disclosure that various other modifications can be made by those in the art based on these illustrated embodiments.

Figure 1:
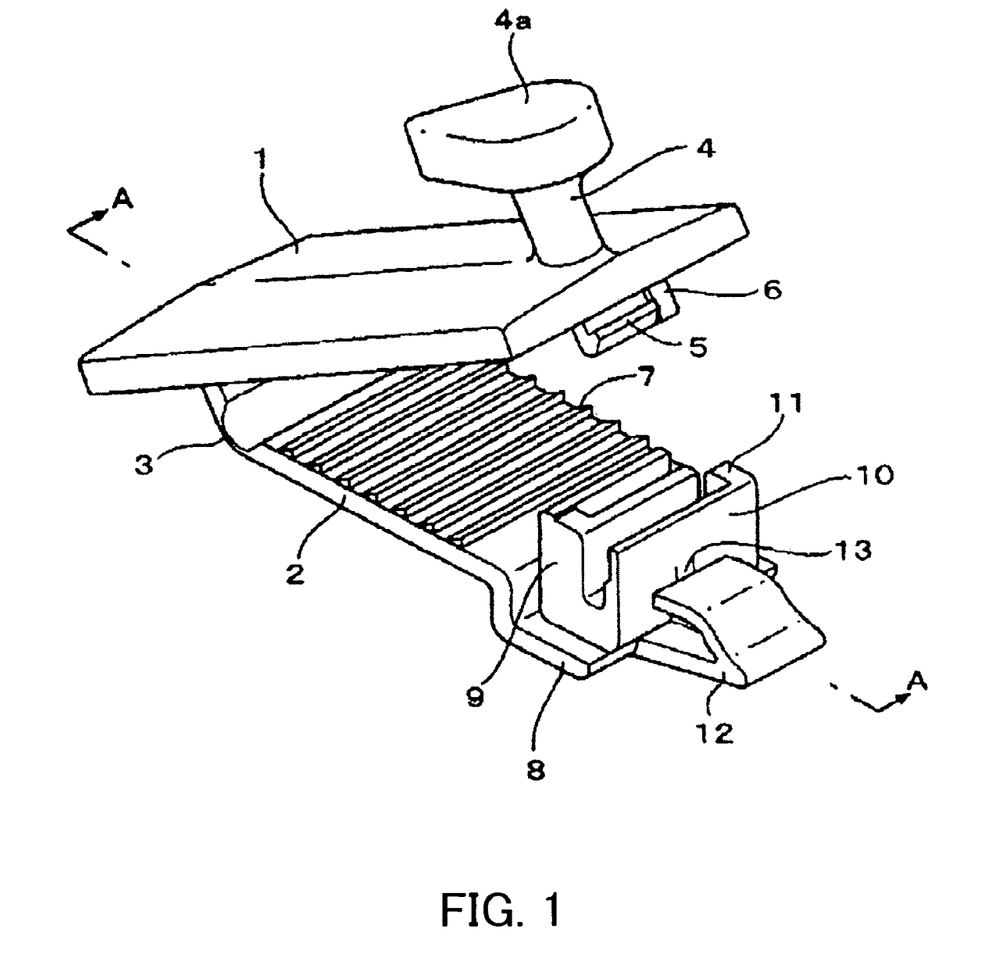
FIG. 1 is a perspective view showing a fastener according to an embodiment of the present invention.
Figure 2A:
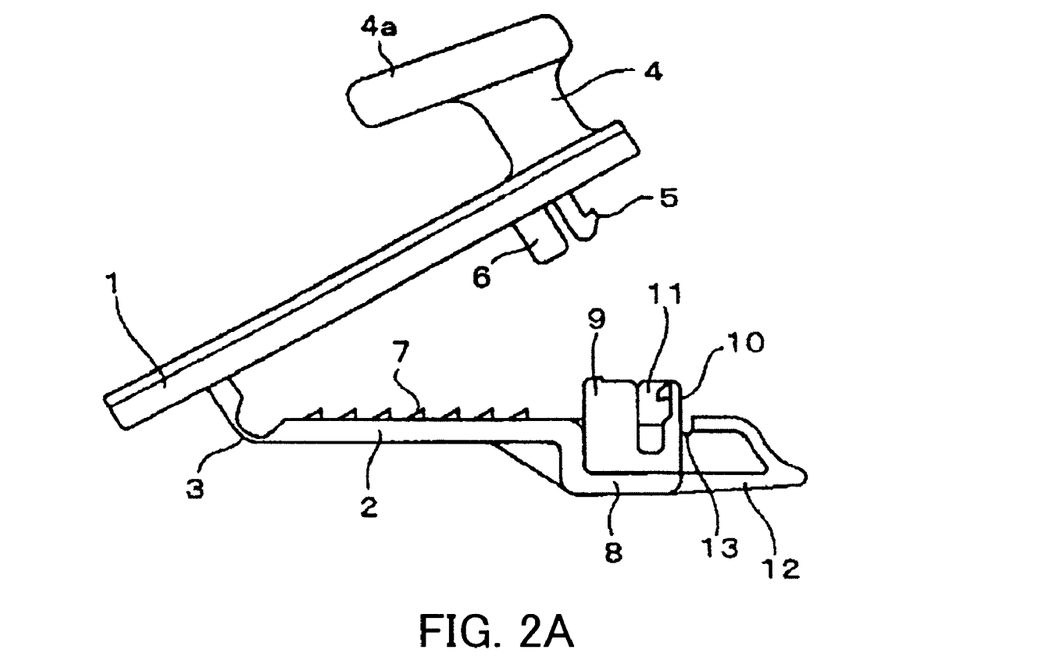
FIG. 2A is a front view of the fastener.
Figure 2B:
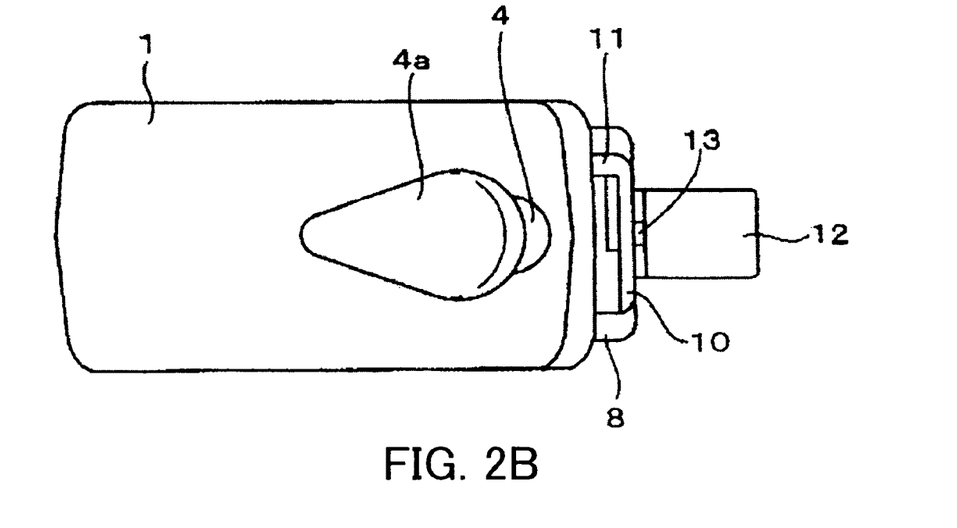
FIG. 2B is a top view of the fastener.
Figure 3:
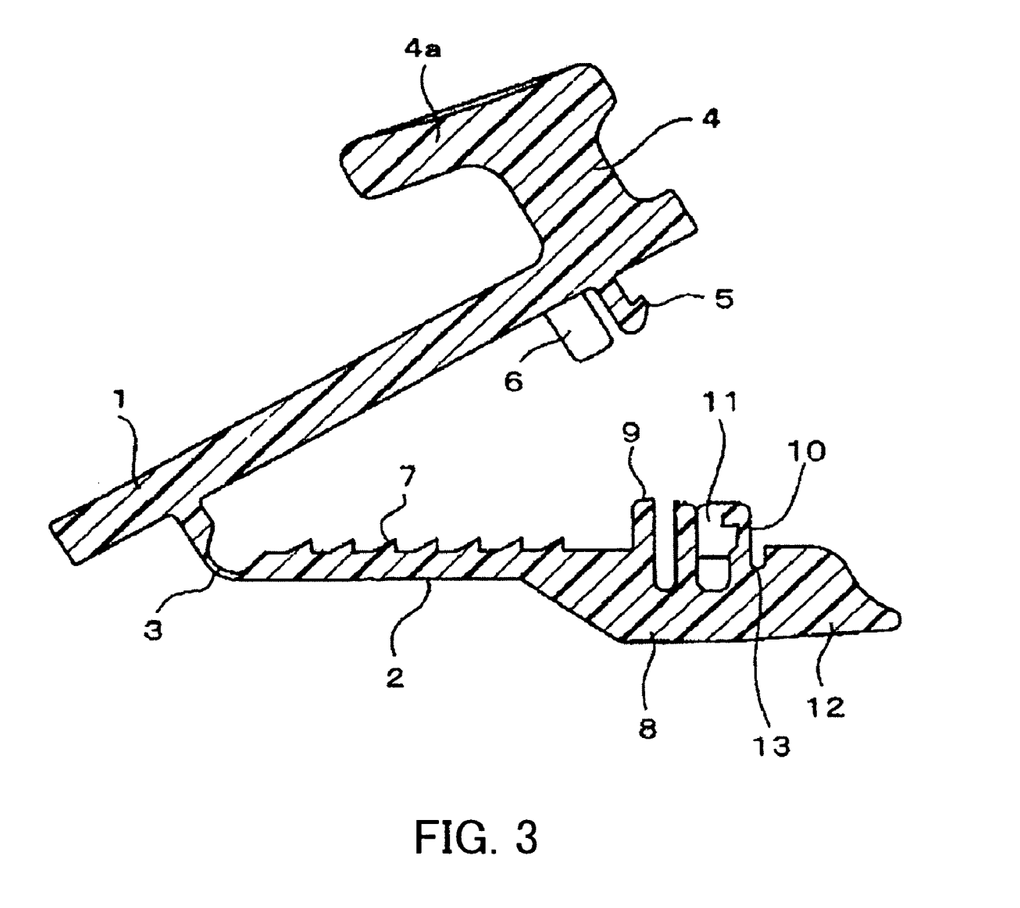
FIG. 3 is a cross-sectional view taken along the line A-A in FIG. 1.

A fastener according to an embodiment of the present invention is shown in FIGS. 1-3. The faster is used to secure a floor mat to a carpet laid on a surface of a floor, such as, e.g., an automobile floor. Like a conventional faster of this kind, this fastener is, for example an integrally molded article made of synthetic resin equipped with an upper clamping member 1 and a lower clamping member 2 resiliently connected via a thin hinge portion 3.

The upper clamping member 1 includes, for example, an engaging projection 4 upwardly protruded from an upper surface of one end portion of the upper clamping member 1. This engaging projection 4 is configured to be inserted in and engaged with an engaging hole 18 formed in a floor mat 17 (see FIG. 5). At the upper end of the engaging projection 4, a head portion 4a of a generally triangle shape as seen from its top for retaining the floor mat 17 is integrally formed. At the lower surface of one end portion of the upper clamping member 1, a locking portion 5 as a locking means configured to be engaged with a receiving wall 10 of the lower clamping member 2, which will be explained later, is downwardly protruded. Located near this locking portion 5, as shown in FIGS. 2A and 3, a shoulder wall 6 configured so as to be brought into contact with a first stopper wall 9 of the lower clamping member 2, which will be mentioned later, to prevent the horizontal displacement in one widthwise direction, is downwardly protruded.

The lower clamping member 2 is provided, for example, with rows of engaging teeth 7 to be engaged with a backside of the carpet 14 at the upper surface side thereof and a downwardly stepped plate-shaped supporting portion 8 at a tip end portion opposite to the thin hinge portion 3. On this supporting portion 8, a first stopper wall 9 of a substantially U-shape, as seen from its top with which the shoulder wall 6 is to be brought into contact is upwardly protruded. At the outside of the first stopper wall 9, a receiving wall 10 as a receiving means configured to be engaged with the locking portion 5 is upwardly protruded. At one side edge of the receiving wall 10, a second stopper wall 11 for preventing the horizontal displacement of the upper clamping member 1 in the other direction by coming into contact with the locking portion 5 is integrally formed, for example, in a bent manner.

Furthermore, at the external surface side of the receiving wall 10, a guide protrusion 12 smaller than the receiving wall 10 in width is forwardly protruded so that the guide protrusion 12 can be inserted into the slit 15 formed in the carpet 14. As shown in FIG. 3, the upper surface of the guide protrusion 12 extends from its tip end gradually upward with a curved surface toward the receiving wall 10 and then extends horizontally. The horizontal upper surface of the guide protrusion 12 and the external surface of the receiving wall 10 are detached via a cutout portion 13 formed therebetween. The lower surface of the guide protrusion 12 is inclined slightly upward as it advances toward the tip end thereof, and the height of the upper surface of the guide protrusion 12 is set to be lower than the height of the receiving wall 10.

Figure 4A:
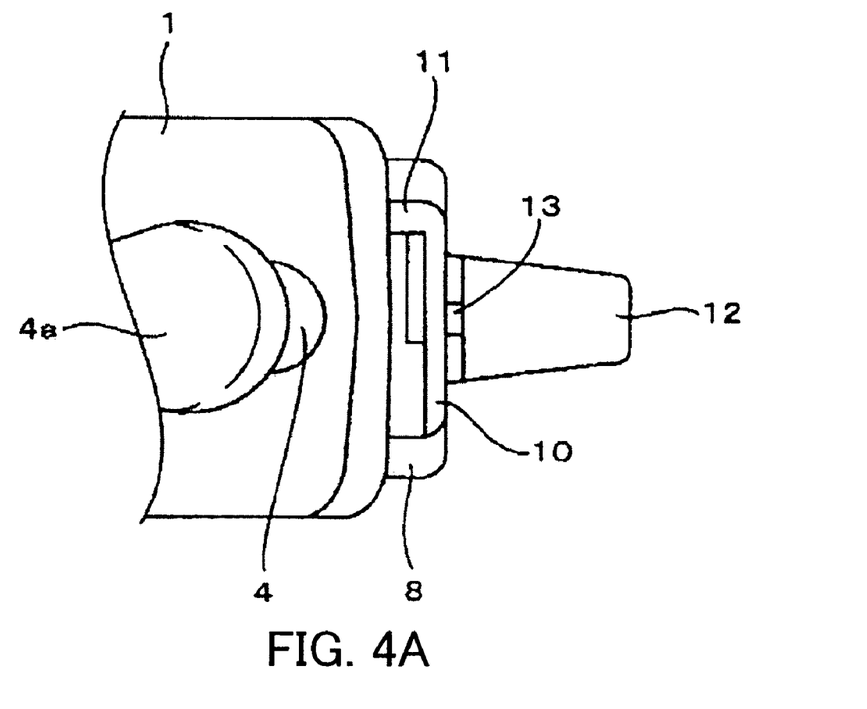
FIG. 4A is a partial top view showing a fastener having a modified guide protrusion according to another embodiment of the present invention.
Figure 4B:
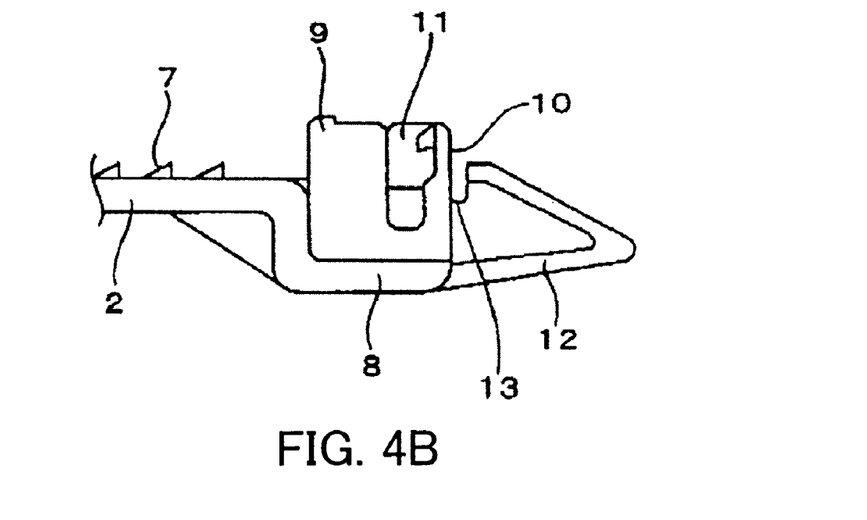
FIG. 4B is a partial side view showing the fastener.

This guide protrusion 12 serves as an insertion guide for the lower clamping member 2 at the time of inserting the lower clamping member 2 into the slit 15 of the carpet 14. It should be noted that the shape of the guide protrusion 12 is not limited to the aforementioned embodiment and can be any shape so long as it can serve as an insertion guide. For example, as shown in FIG. 4A, the width can be decreased toward its tip end. Furthermore, as shown in FIG. 4B, the vertical cross-section can be formed into a triangular shape.

Figure 5:
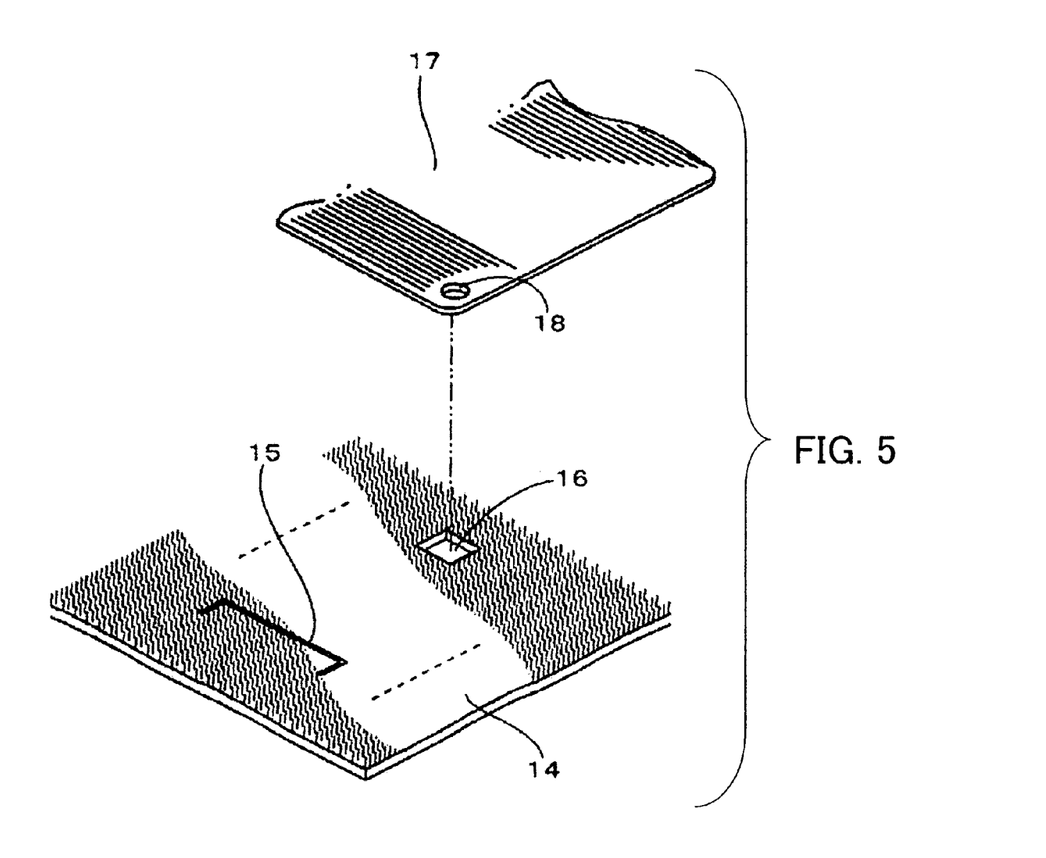
FIG. 5 is an explanatory view showing the relation between a carpet and a floor mat.

As shown in FIG. 5, the carpet 14 to be laid on a floor surface has a slit 15 into which the lower clamping member 2 is to be inserted from the guide protrusion 12 and a rectangular installation hole 16 into which the receiving wall 10 and the second stopper wall 11 of the lower clamping member 2 are to be disposed from its back side. The installation hole 16 is formed away from the slit 15 at a certain distance. On the other hand, the floor mat 17 to be secured to the carpet 14 has an engaging hole 18 for engaging the engaging projection 4 at a corner portion.

Figure 6:
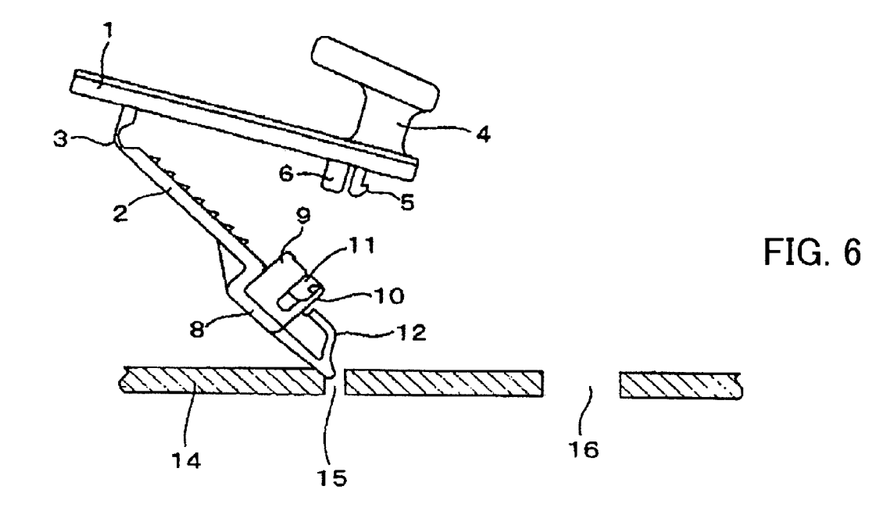
FIG. 6 is a cross-sectional view showing the state in which the guide protrusion is approached the slit of the carpet.
Figure 7:
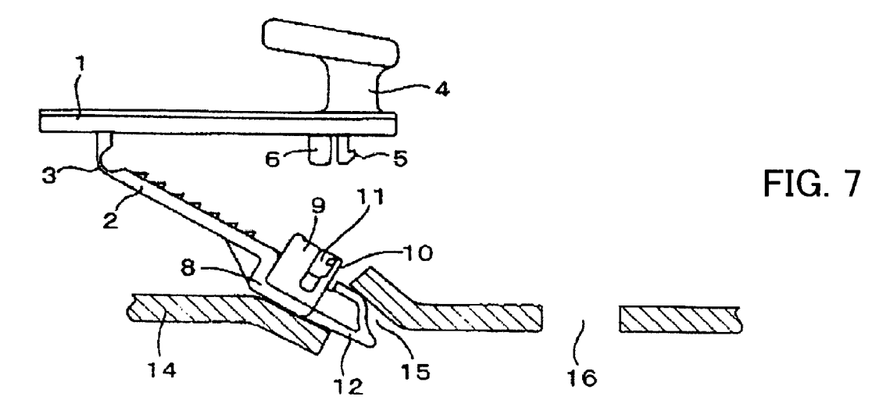
FIG. 7 is a cross-sectional view showing the state in which the guide protrusion is inserted in the slit of the carpet.

Now, the securing of the post-installation floor mat 17 to the carpet 14 will be explained. Initially, as shown in FIG. 6, the tip end of the guide protrusion 12 of the lower clamping member 2 is inserted in the slit 15 of the carpet 14. At this time, as shown in FIG. 7, the guide protrusion 12 is inserted while lifting the edge of the slit 15 upward by the tapered upper surface of the guide protrusion 12. This facilitates the insertion operation as compared with the case in which a tip end of a lower clamping member with no guide protrusion is forcibly inserted in the slit 15.

Figure 8:
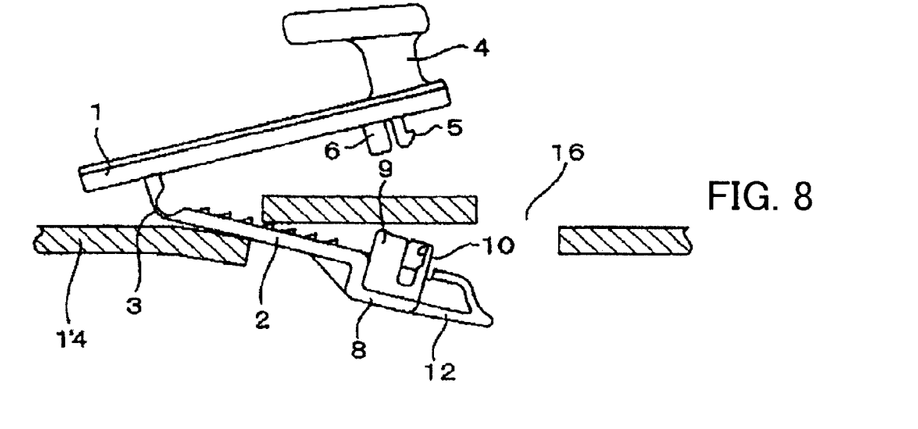
FIG. 8 is a cross-sectional view showing the state in which the lower clamping member is halfway inserted in the back side of the carpet.
Figure 9:
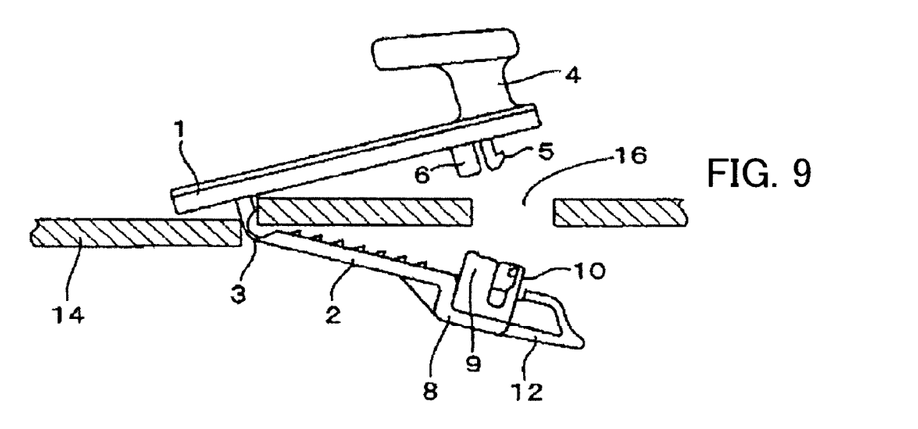
FIG. 9 is a cross-sectional view showing the state in which the lower clamping member is further inserted in the back side of the carpet.
Figure 10:
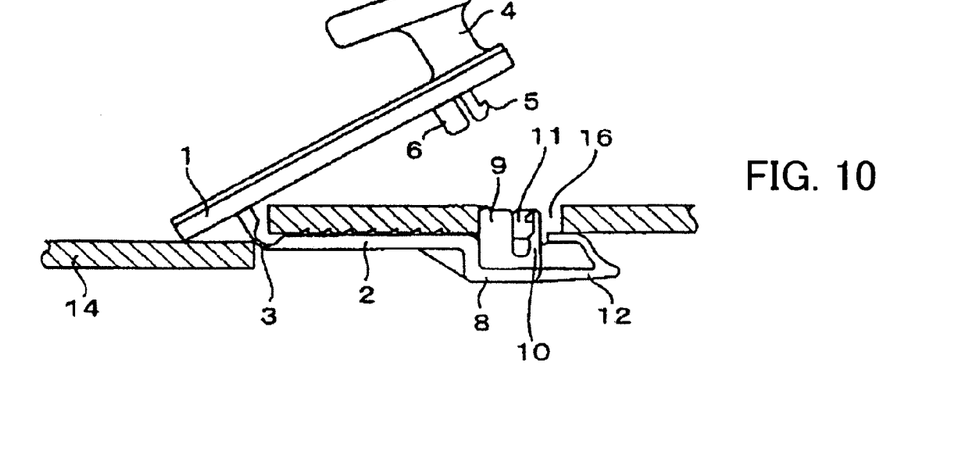
FIG. 10 is a cross-sectional view showing the state in which the receiving wall and the first stopper wall are inserted in the engaging hole of the carpet.

As shown in FIGS. 8 and 9, after inserting the lower clamper 2 under the backside of the carpet 14 while being guided by the guide protrusion 12, the receiving wall 10 and the first stopper wall 9 are fitted in the installation hole 16 of the carpet 14 as shown in FIG. 10. Thus, the lower clamping member 2 is completely disposed at the backside of the carpet 14. In this state, since the upper surface of the guide protrusion 12 is lower than the receiving wall 10 in height, the peripheral portion of the installation hole 16 is disposed on the upper surface of the guide protrusion 12, which prevents the peripheral portion of the installation hole 16 from being disposed on the receiving wall 10.

Figure 11:
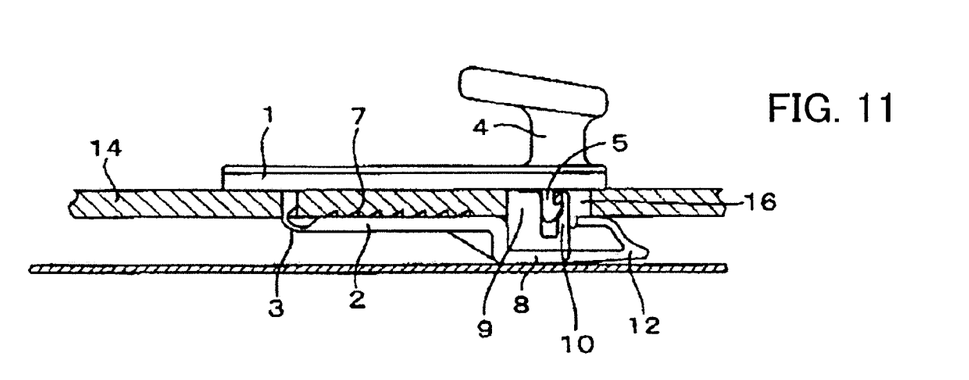
FIG. 11 is a cross-sectional view showing the state in which the carpet is clamped from the inner and outer sides by the upper clamping member and the lower clamping member.
Figure 12:
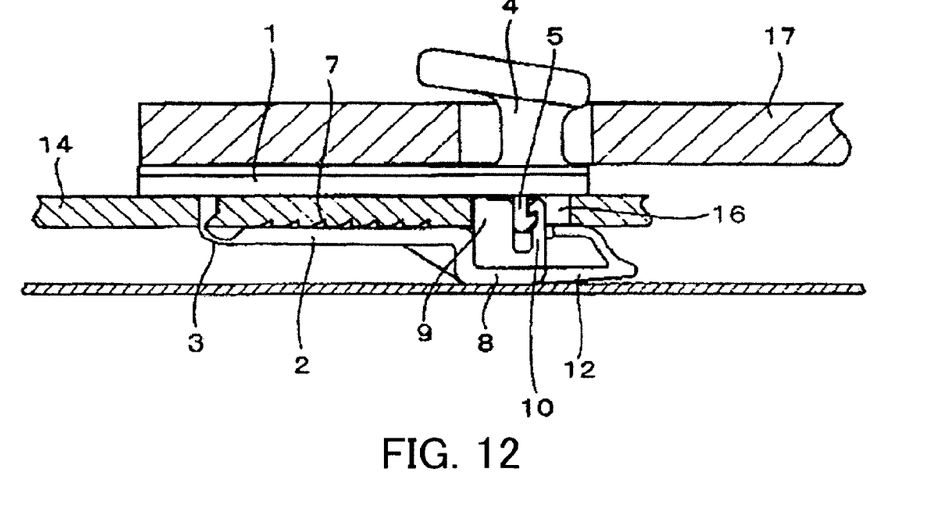
FIG. 12 is a cross-sectional view showing the state in which the floor mat is secured on the carpet.

Then, the upper clamping member 1 is pivoted about the thin hinge portion 3 by being pressed down toward the lower clamping member 2 to engage the locking portion 5 with the receiving wall 10. As a result, as shown in FIG. 11, the carpet 14 is clamped from both sides by the upper clamping member 1 and the lower clamping member 2. Thereafter, the floor mat 17 is disposed on the carpet 14 so that the engaging projection 4 of the fastener is inserted in and engaged with the engaging hole 18 of the floor mat 17. In this state, as shown in FIG. 12, the floor mat 17 can be assuredly secured to the carpet 14 without causing displacement of the floor mat 17 on the carpet 14. Furthermore, the head portion 4a formed at the upper end of the engaging projection 4 prevents the detachment of the floor mat 17 from the engaging projection 4.

When the locking portion 5 is engaged with the receiving wall 10, the receiving wall 10 is pressed by the locking portion 5 toward the guide protrusion 12. At this time, since the external surface of the receiving wall 10 and the upper surface of the guide protrusion 12 are detached via the cutout portion 18, the receiving wall 10 can be easily bent outward, enabling engagement with the locking portion 5.

Figure 13:
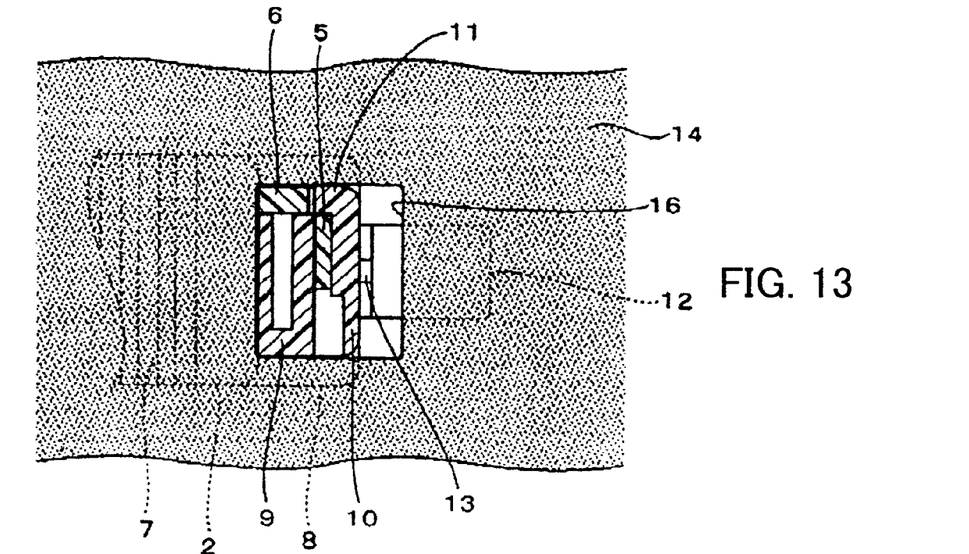
FIG. 13 is a cross-sectional view showing a principal portion of a clamper in a horizontal displacement prevention state according to an embodiment of the present invention.

In this engaged state, as shown in FIG. 13, the shoulder wall 6 of the upper clamping member 1 is in contact with the first stopper wall 9 of the lower clamping member 2, and the locking portion 5 is in contact with the second stopper wall 11 of the receiving wall 10, which results in assured prevention of the horizontal displacement of the upper clamping member 1 with respect to the lower clamping member 2 in the widthwise direction.

Figure 14:
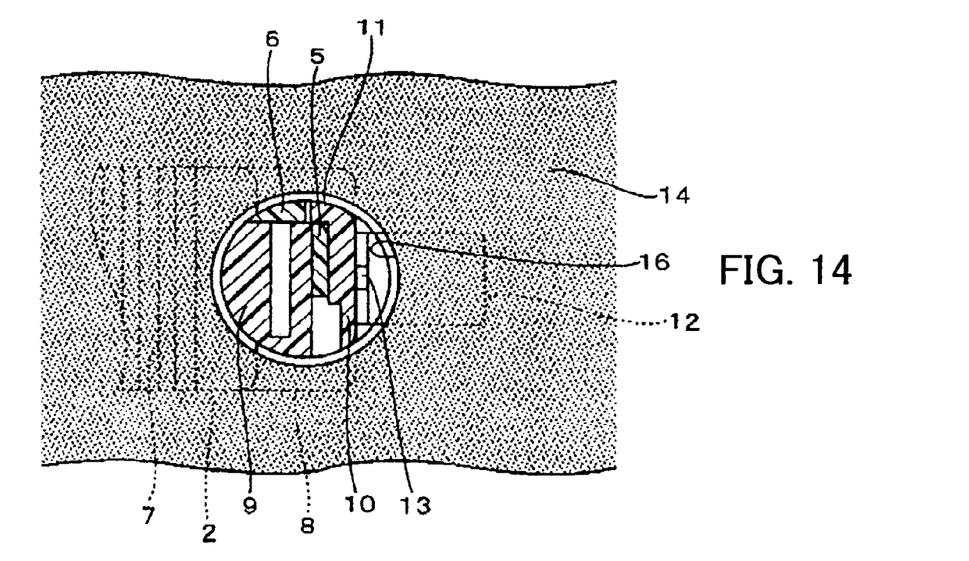
FIG. 14 is a cross-sectional view showing a principal portion of a clamper in a horizontal displacement prevention state according to another embodiment of the present invention.

In the aforementioned embodiment, the installation hole 16 of the carpet 14 is formed into a rectangle shape, and the receiving wall 10 and the first stopper wall 9 are disposed in the rectangular installation hole 16. The present invention, however, is not limited to the above. For example, in place of the above, as shown in FIG. 14, it can be configured such that the installation hole 16 is formed into a circular shape and the receiving wall 10 and the first stopper wall 9 are disposed in the circular installation hole 16.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

We claim:

1. A fastener for securing a floor mat to a carpet laid on a floor, the fastener, comprising:
   a lower clamping member;
   an upper clamping member;
   a hinge portion connecting the upper clamping member and the lower clamping member in a pivotable manner;
   a supporting portion forwardly protruded from a tip end portion of the lower clamping member; and
   a guide protrusion forwardly protruded from a tip end portion of the supporting portion and configured to be inserted in a slit formed in the carpet,
   wherein the upper clamping member has an engaging projection formed at an outer surface thereof and configured to be inserted in an attaching hole formed in the floor mat and has a locking portion formed at an inner surface of a tip end portion of the upper clamping member, and
   wherein the supporting portion has an receiving portion for engaging with the locking portion of the upper clamping member.

2. The fastener according to claim 1, wherein an upper surface of the guide protrusion is tapered.

3. The fastener according to claim 1, wherein a lower surface of the guide protrusion is inclined upward as it advances toward its tip end.

4. The fastener according to claim 1, wherein an upper surface of the guide protrusion and an external surface of the engaging portion of the lower clamping member are separated by a cutout portion.

5. The fastener according to claim 1, wherein a height of the upper surface of the guide protrusion is lower than a height of the receiving portion.

6. The fastener according to claim 1, further comprising:
   a shoulder wall formed on an inner surface of the upper clamping member;
   a first stopper wall formed between a tip end portion of the lower clamping member and the receiving portion, the first stopper wall coming into contact with the shoulder wall to thereby prevent displacement of the upper clamping member in one direction; and
   a second stopper wall formed at the receiving portion, the second stopper wall coming into contact with the locking portion to thereby prevent displacement of the upper clamping member in another direction.

7. The fastener according to claim 1, wherein the lower clamping member has rows of engaging teeth formed on an upper surface thereof.

8. The fastener according to claim 1, wherein the engaging projection has a head portion formed at an upper end thereof.

9. The fastener according to claim 8, wherein the head portion is formed into a generally triangular shape.

10. The fastener according to claim 1, wherein the fastener is an integrally formed article made of synthetic resin.

11. The fastener according to claim 1, wherein the hinge portion is a thin walled portion.

12. The fastener according to claim 1, wherein the guide protrusion is formed into a generally triangular shape.

13. The fastener according to claim 1, wherein a width of the guide protrusion is narrowed toward a tip end thereof.

14. The fastener according to claim 1, wherein the supporting portion is extended from the tip end portion of the lower clamping member in a downwardly stepped manner.

15. The fastener according to claim 1, wherein the floor mat is an automobile floor mat.

16. A securing structure for securing an automobile floor mat to a carpet laid on a floor of an automobile, the securing structure, comprising:
- a fastener as recited in claim 1,
- wherein the carpet has a slit and an installation hole formed apart from the slit at a certain distance,
- wherein the floor mat has an engaging hole,
- wherein the lower clamping member of the fastener is disposed at a backside of the carpet with the hinge portion disposed in the slit and the receiving portion inserted in the installation hole,
- wherein the locking portion of the upper clamping member is engaged with the receiving portion of the supporting portion, and
- wherein the floor mat is disposed on the carpet with the engaging projection of the fastener inserted in and engaged with the engaging hole of the floor mat.

17. A fastener for securing an automobile floor mat to a carpet laid on a floor within an automobile, the fastener, comprising:
- a lower clamping member;
- an upper clamping member;
- a hinge portion connecting the upper clamping member and the lower clamping member in a pivotable manner;
- a supporting portion forwardly protruded from a tip end portion of the lower clamping member; and
- a guide protrusion forwardly protruded from a tip end portion of the supporting portion and configured to so as to facilitate an insertion of the supporting portion and the lower clamping member to a backside of the carpet via a slit formed in the carpet,
- wherein the upper clamping member has an engaging projection formed at an outer surface of a tip end portion thereof and configured to be inserted in an attaching hole formed in the floor mat and a locking portion formed at an inner surface of the tip end portion,
- wherein the supporting portion has a receiving portion for engaging the locking portion of the upper clamping member,
- wherein an upper surface of the guide protrusion is tapered shape.

18. The fastener according to claim 17, further comprising:
- a shoulder wall formed on an inner surface of the upper clamping member;
- a first stopper wall formed between a tip end portion of the lower clamping member and the receiving portion, the first stopper wall coming into contact with the shoulder wall to thereby prevent displacement of the upper clamping member in one direction; and
- a second stopper wall formed at the receiving portion, the second stopper wall coming into contact with the locking portion to thereby prevent displacement of the upper clamping member in another direction.

19. The fastener according to claim 17, wherein the lower clamping member has rows of engaging teeth formed on an upper surface thereof.

* * * * *